(12) United States Patent
Panosian et al.

(10) Patent No.: US 10,334,092 B2
(45) Date of Patent: Jun. 25, 2019

(54) MOBILE PHONE

(71) Applicant: Toughbuilt Industries, Inc., Glendale, CA (US)

(72) Inventors: Michael H. Panosian, Irvine, CA (US); Joshua Keeler, Bradbury, CA (US)

(73) Assignee: TOUGHBUILT INDUSTRIES, INC., Lake Forest, CA (US)

( * ) Notice: Subject to any disclaimer, the term of this patent is extended or adjusted under 35 U.S.C. 154(b) by 0 days.

(21) Appl. No.: 15/861,467

(22) Filed: Jan. 3, 2018

(65) Prior Publication Data

US 2018/0191881 A1 Jul. 5, 2018

Related U.S. Application Data

(63) Continuation-in-part of application No. 29/589,805, filed on Jan. 4, 2017, now abandoned.

(60) Provisional application No. 62/442,354, filed on Jan. 4, 2017, provisional application No. 62/444,797, filed on Jan. 10, 2017.

(51) Int. Cl.
*H04M 1/02* (2006.01)

(52) U.S. Cl.
CPC ........ *H04M 1/0279* (2013.01); *H04M 1/0202* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,924,785 A | * | 7/1999 | Zhang | B60Q 1/302 362/241 |
| 2012/0069517 A1 | * | 3/2012 | Prest | G06F 1/1656 361/679.56 |
| 2013/0078398 A1 | * | 3/2013 | Weber | B32B 37/144 428/34.1 |
| 2013/0294020 A1 | * | 11/2013 | Rayner | H05K 5/061 361/679.01 |
| 2016/0050302 A1 | * | 2/2016 | Lee | H04B 1/3888 455/575.1 |
| 2016/0077627 A1 | * | 3/2016 | Vecera | G06F 3/044 345/174 |
| 2017/0013731 A1 | * | 1/2017 | Lee | H04B 1/3888 |

* cited by examiner

*Primary Examiner* — Junpeng Chen
(74) *Attorney, Agent, or Firm* — Myron Greenspan; Lackenbach Siegel LLP (57) ABSTRACT

A mobile phone body for enclosing one or more mobile phone components is disclosed. The mobile phone body may include a face, a back side, and two lateral sides. The face may include a screen. The screen may be a touch screen. The back side may be contoured.

3 Claims, 8 Drawing Sheets

MOBILE PHONE

PRIORITY

This application claims the benefit of priority to U.S. Provisional Application No. 62/442,354, filed Jan. 4, 2017, and the benefit of priority to U.S. Provisional Application No. 62/444,797, filed Jan. 10, 2017. This application is a continuation in part of U.S. patent application Ser. No. 29/589,805, filed Jan. 4, 2017. All of the forgoing priority applications are incorporated by reference into this application as if fully set forth herein.

BACKGROUND

Mobile phones are a very convenient way to stay connected. Generally, the phone is lightweight and compact for easy handling, talking, storage, etc. However, to achieve the desired portability, especially to minimize size, weight, and profile, mobile phones have become extremely fragile. Therefore, it would be desirable for a mobile phone that can maintain a compact and lightweight configuration for ergonomic handling, while providing a more durable and ruggedized device.

SUMMARY

Aspects of the present disclosure include a mobile phone body.

Exemplary embodiments described herein provide a mobile phone body for enclosing one or more mobile phone components. The mobile phone body may include a face, a back side, and two lateral sides. The face may include a screen. The screen may be a touch screen. The back side may be contoured.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further purposes and advantages, will be better understood from the following description when considered in connection with the accompanying figures. It is to be expressly understood, however, that each of the figures is provided for the purposes of illustration and description only and is not intended as a definition of the limits of the present disclosure.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

In an exemplary embodiment, a ruggedized mobile phone is provided that may maintain compact and ergonomic handling while being sturdy and durable. Exemplary embodiments may include novel case configurations and component layouts. For example, a mobile phone body may include a thick (front/screen to back/case dimension) central portion and narrower perimeter dimension. The mobile phone casing may include greater wall thickness dimensions at top and bottom terminal ends than along the lateral side or front/back walls. The mobile phone casing may include rounded corners of increased thickness. The case may also be held together with a plurality of screws around the perimeter region to more securely attach the front face to the back face. The casing may also include a gasket, similar to an O-ring to seal the casing.

In an exemplary embodiment, a dynamically adjustable mobile device is provided that permits the interchangeable and removable attachment of various implements to a mobile device, such as a mobile phone. For example, the mobile device may include a plurality of attachment points such as anchors for which the attachable component may removably attach, or hook. The mobile device may also include a data/power interface to couple the attachable component to the mobile device and integrate the two separable components into a single working device.

Although embodiments of the invention may be described and illustrated herein in terms of a mobile phone, it should be understood that embodiments of this invention are not so limited, but are additionally applicable to mobile electronic devices, such as tablets, laptops, PDA's, and other mobile digital devices.

Figure 1:
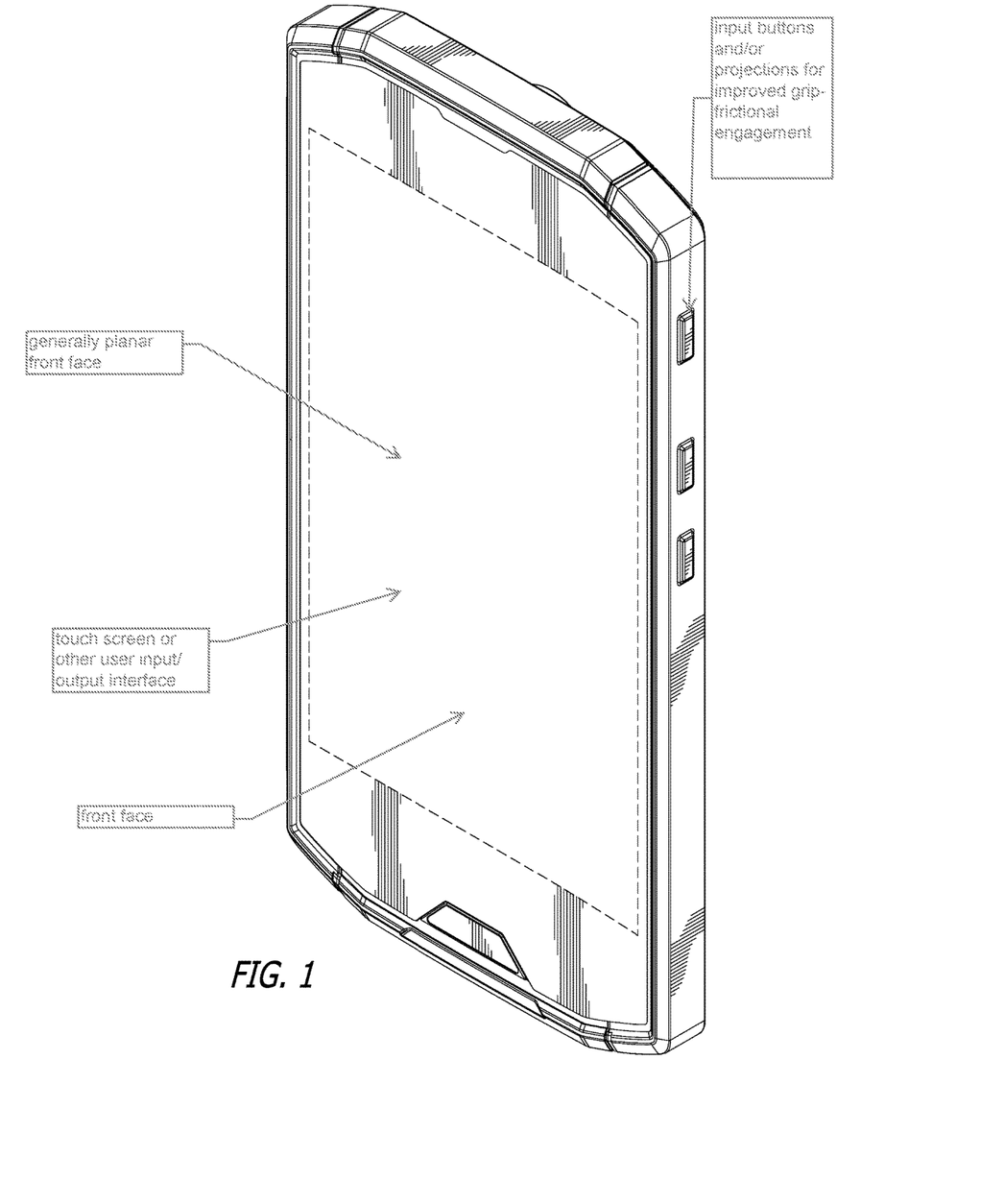
FIG. 1 is a front perspective view of a Mobile Phone showing our new design.
Figure 2:
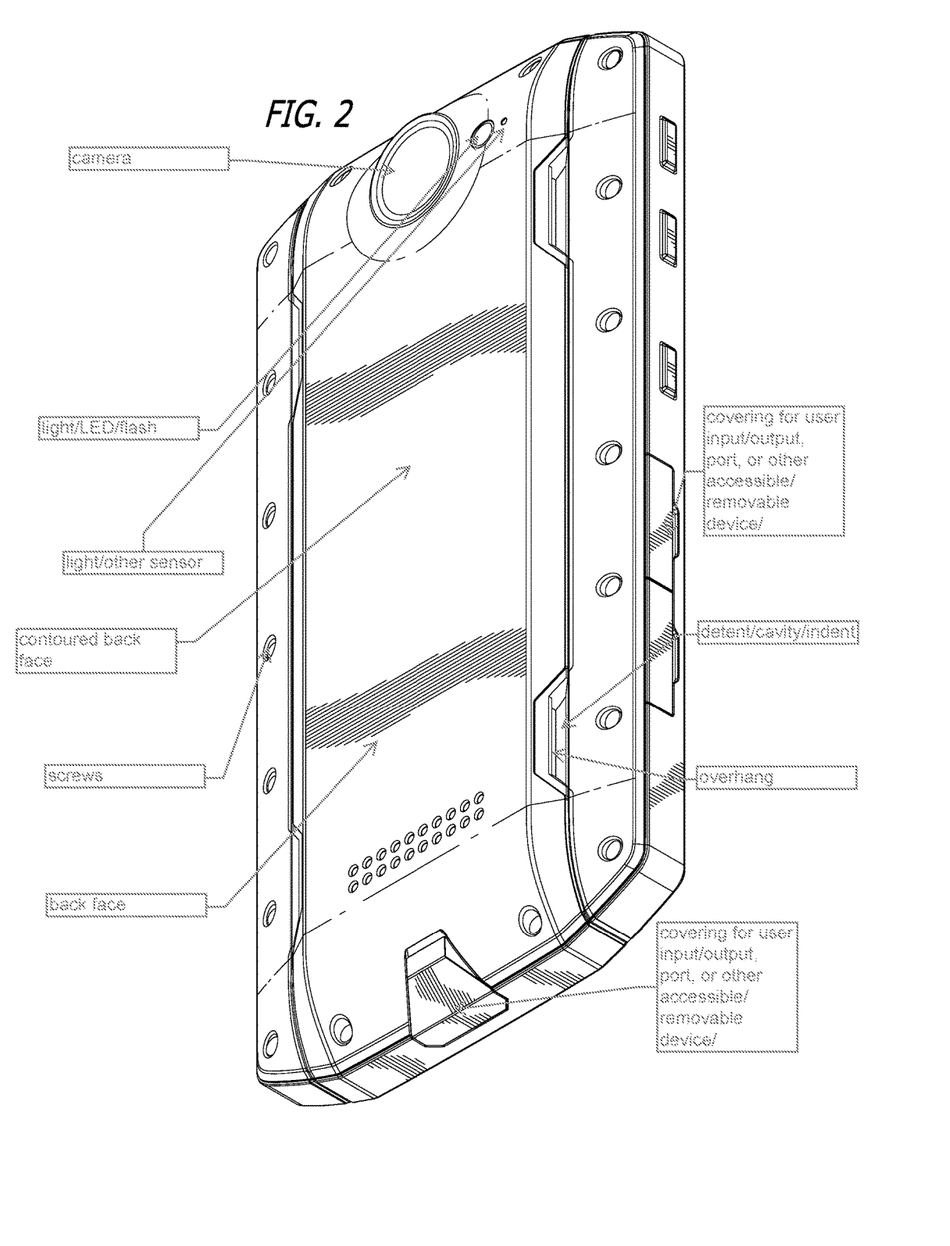
FIG. 2 is a rear perspective view of the Mobile Phone illustrated in FIG. 1.
Figure 3:
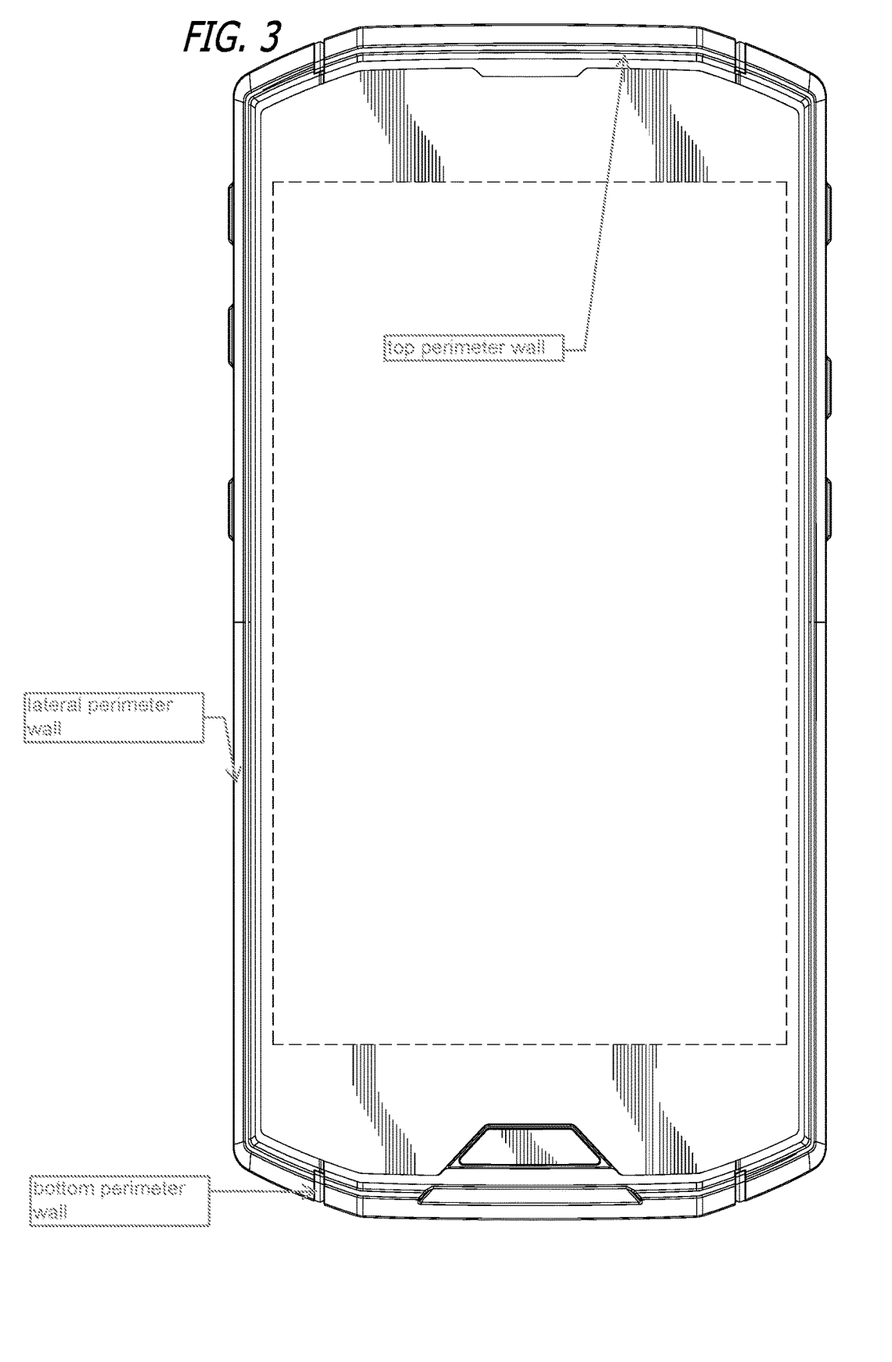
FIG. 3 is a front elevation view of the Mobile Phone illustrated in FIG. 1.
Figure 4:
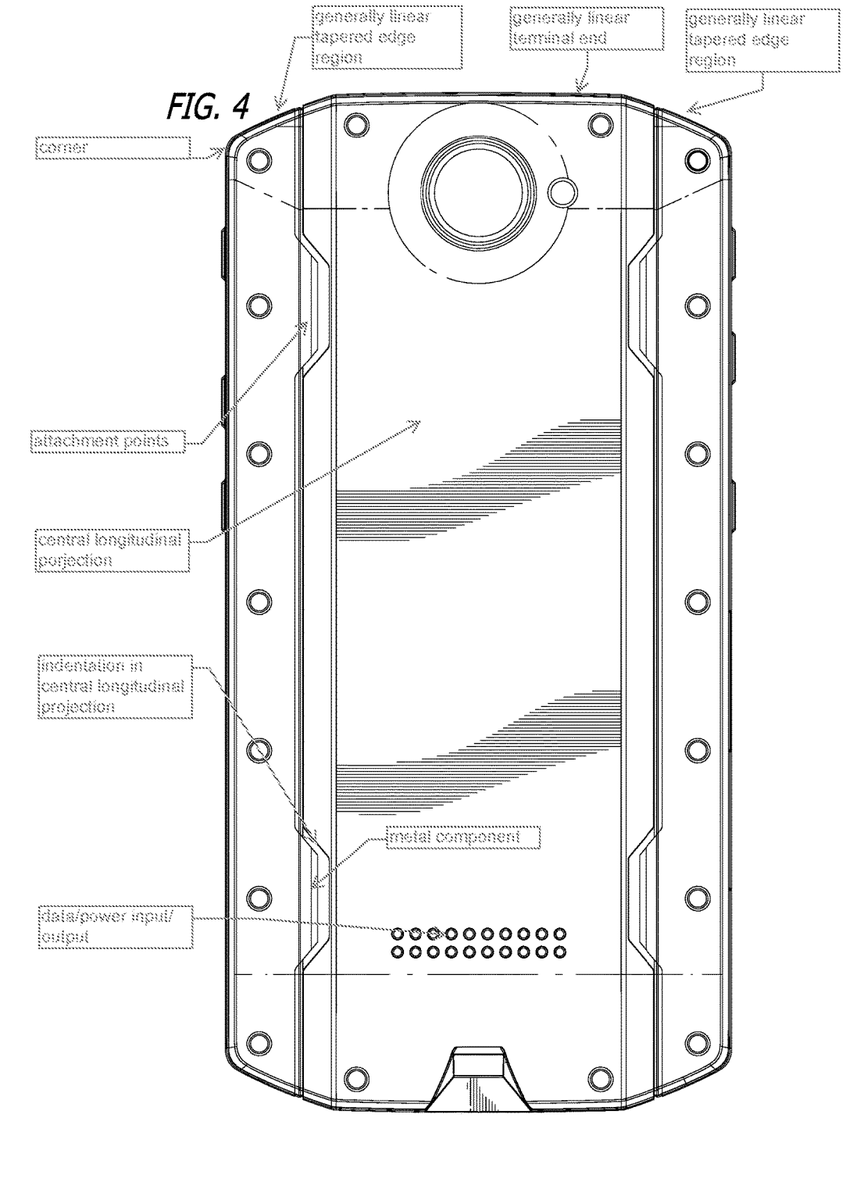
FIG. 4 is a back elevation view of the Mobile Phone illustrated in FIG. 1.
Figure 5:
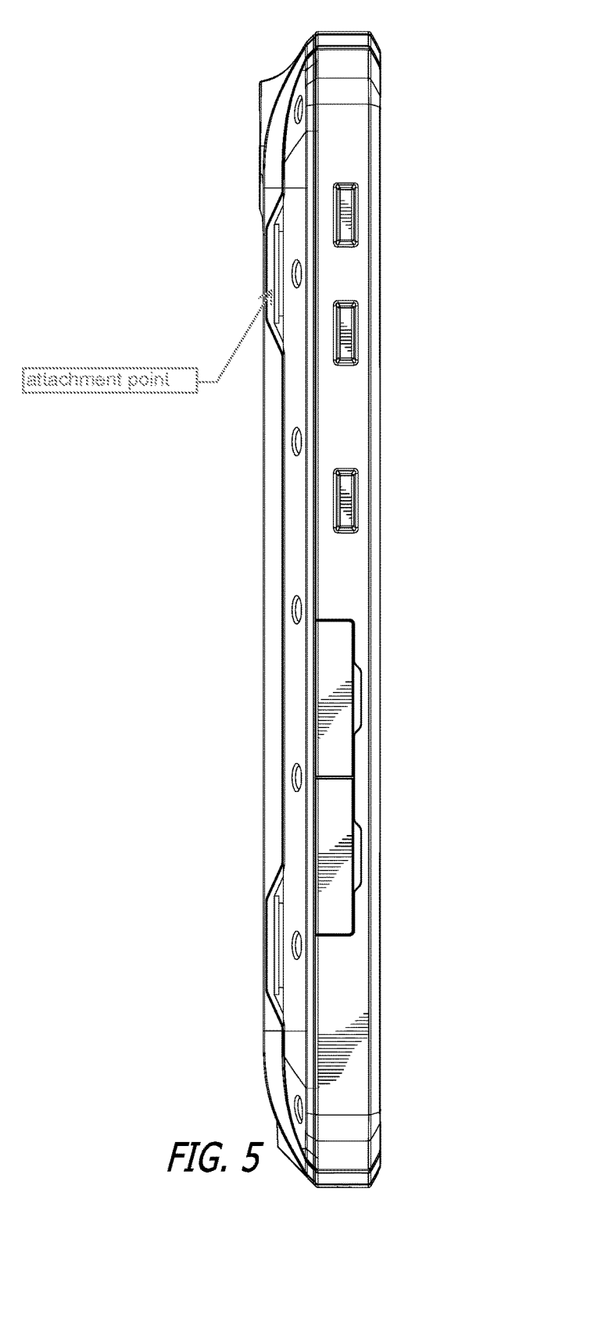
FIG. 5 is a left side elevation view of the Mobile Phone illustrated in FIG. 1.
Figure 6:
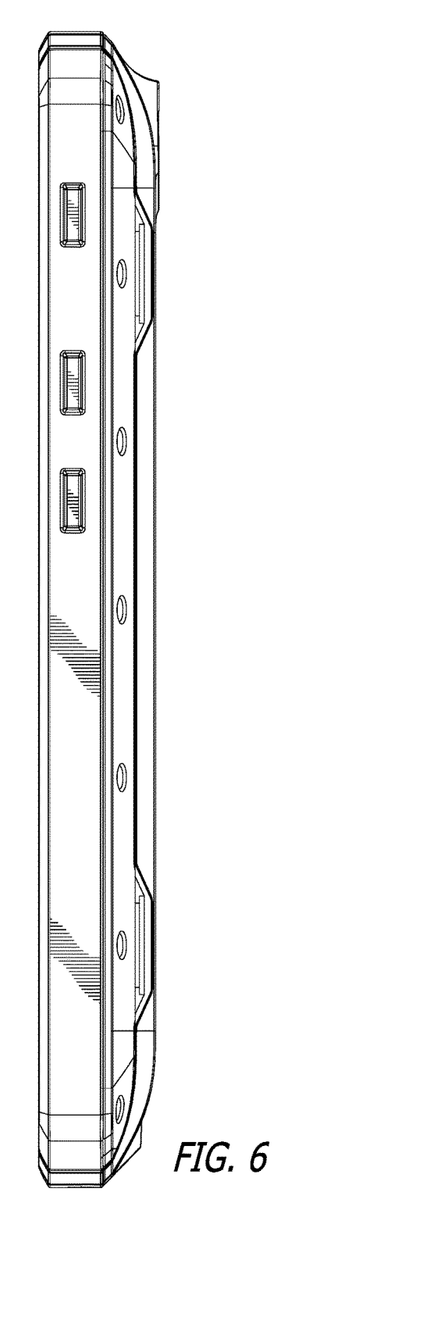
FIG. 6 is a right side elevation view of the Mobile Phone illustrated in FIG. 1.

As shown, in FIG. 1, the front face generally comprises a touch screen or other combination of display and user interface/input. The screen may take up the entire face or some portion of the face. Portions of the face may include other input/output devices, such as buttons, lights, camera, display, screen, touch pad, keyboard, etc. and combinations thereof. As seen in FIG. 2, the perimeter edge of the device may include additional input/output components such as buttons or ports. For example, power and/or volume buttons may be included as well as micro-USB or other power or data ports. The buttons and/or ports may or may not include coverings to secure against dust, moisture, temperature, or other environmental impediments that may be detrimental to electronic components. The coverings may be tethered, hinged, and/or separable to/from the phone casing. As seen in FIG. 4, the mobile phone may also include a camera, light, and/or lens for receiving images.

In an exemplary embodiment, a ruggedized mobile phone is provided that may maintain compact and ergonomic handling while being sturdy and durable. Exemplary embodiments may include novel case configurations and component layouts.

Figures 10, 11:
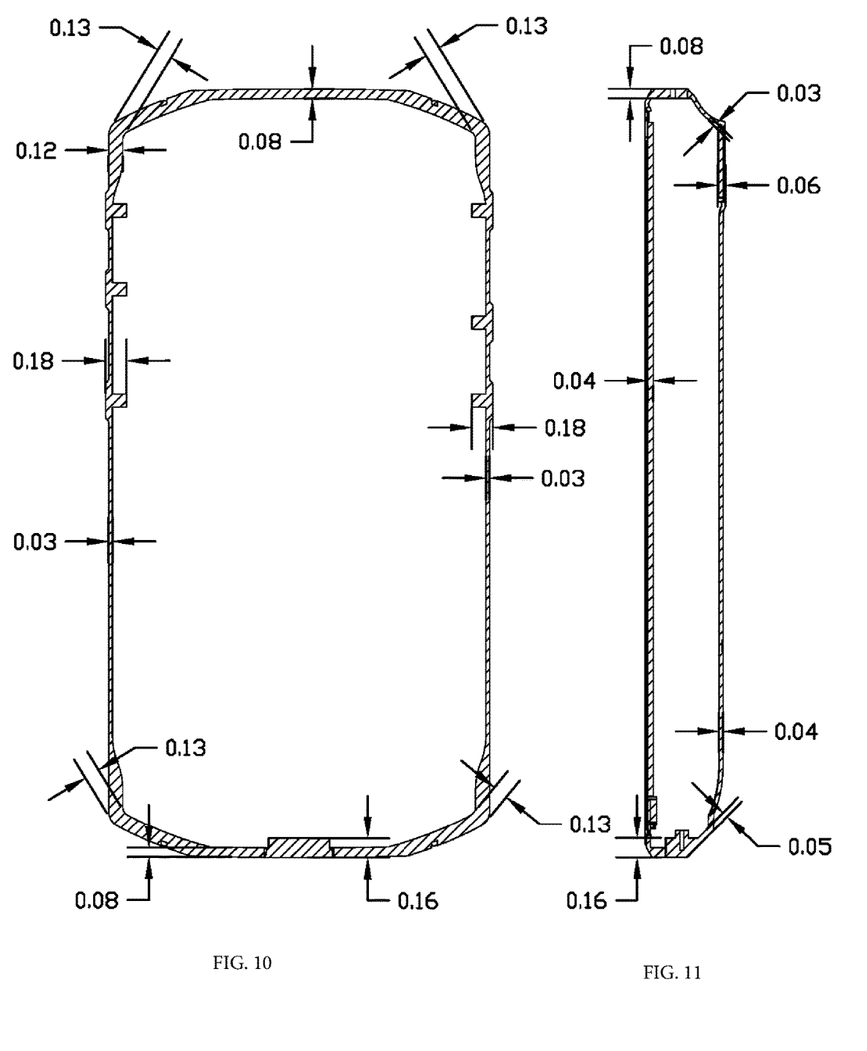
FIG. 10 is a cross sectional view taken in plane of the phone including exemplary dimensions in inches.
FIG. 11 is a cross sectional view taken perpendicular to the plane of the phone including exemplary dimensions in inches.

In an exemplary embodiment, the mobile phone casing may include variable wall thickness. For example, the mobile phone casing may include thicker wall portions for greater impact absorption at corners and top and bottom terminal edges. As seen in FIGS. 10-11, the mobile phone casing may include greater wall thickness dimensions at top and bottom terminal ends than along the lateral side or front/back walls. The mobile phone casing may include rounded corners of increased thickness. Exemplary dimensions are illustrated in inches. For example, the wall thickness of the phone along lateral edges may be generally 0.02-0.05 inches. The top and bottom terminal end regions of the lateral edges may increase to 3-5× the thickness or more, such as to 0.06-0.15 inches or 0.1-0.15 inches. In an exemplary embodiment, the lateral edges are approximately 0.03 inches along a substantial length, while terminal end regions increase to approximately 0.12 inches. The mobile phone casing may include rounded edges along or between the perimeter/lateral sides. These rounder edges may be radially thicker than the wall thickness of the adjoining lateral edges, either along an entire length or partial length (such as compared to the thinner middle portion of the lateral wall). For example, the rounded edges may be approximately 0.07-0.2 inches or 0.11-0.16 inches. In the exemplary embodiment shown, the radial thickness of the corners is approximately 0.13 inches. The top and bottom terminal ends may also be tapered, such that a longitudinal length of the device through the central axis is greater than the longitudinal length of the device at the lateral edges. Therefore, the device may provide a greater impact area when hit along a lateral edge. The mobile phone top and bottom lateral edges may include three generally linear sections, with adjacent sections coupled by rounded transition regions.

Figure 9:
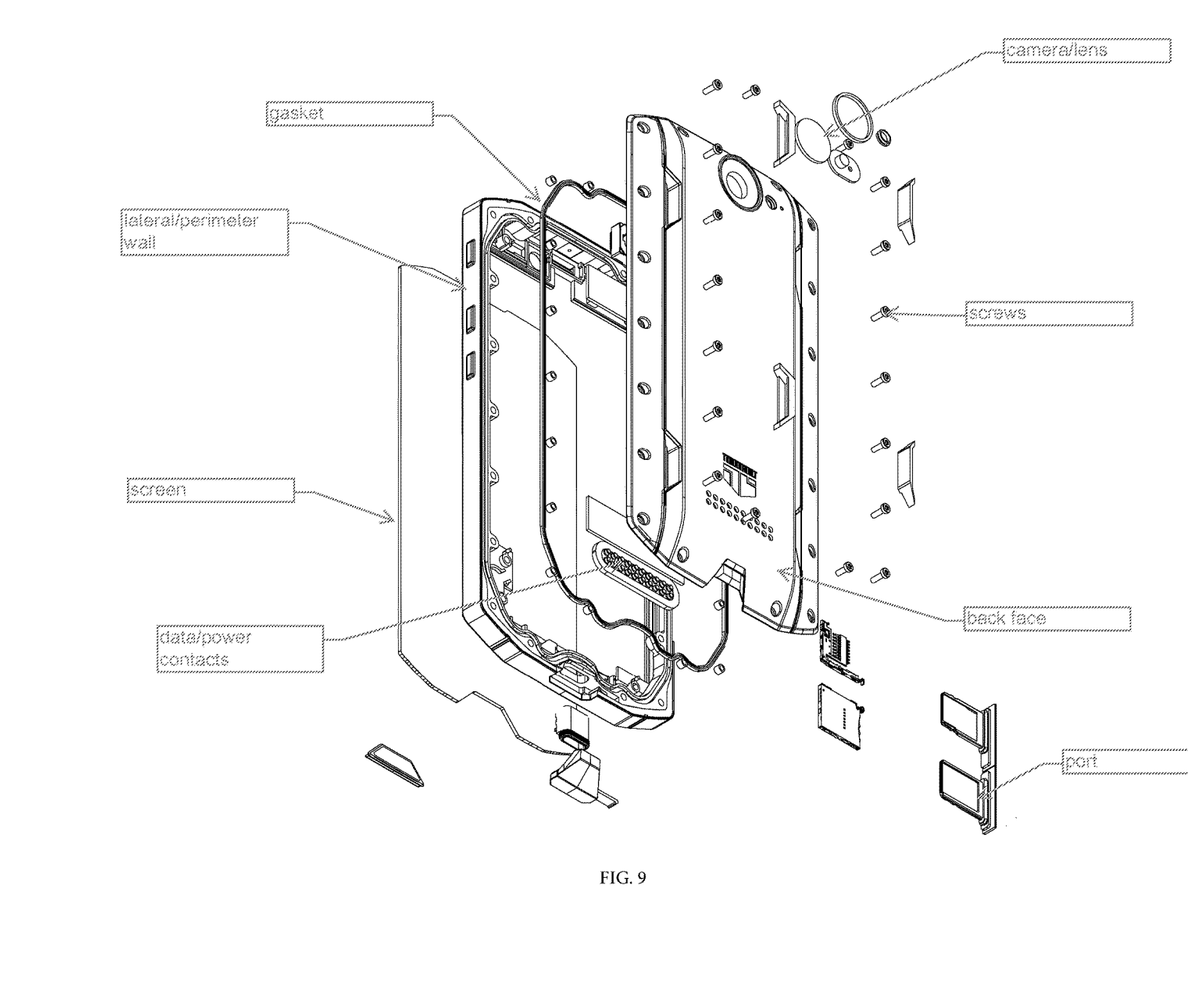
FIG. 9 is an exploded vies of the Mobile Phone enclosure from FIG. 1.

In an exemplary embodiment, the case may be held together with a plurality of screws around the perimeter region of the back face to more securely attach the front face to the back face. For example, as seen in FIG. 9, a plurality of screws are used along each side of the back face. As shown, five screws are used along each lengthwise edge, two for each widthwise edge and one at each corner. The case may use 12-20 screws around the perimeter of the case to attach the front face to the back face. As shown, 16 screws are used. The additional screws require additional attachment space and therefore are conventionally not used. However, the additional screws permit the front and/or back faces to be of reduced thickness not conventionally used. The reduced thickness is beneficial in the instant application to maintain interior space for internal electronic components while permitting additional perimeter wall thickness for impact resistance or improved durability. The casing may also include a gasket, similar to an O-ring to seal the casing. The gasket may be positioned in an indentation within the back face and/or perimeter wall and seal the mobile device when assembled for water/moisture resistance.

Figure 7:
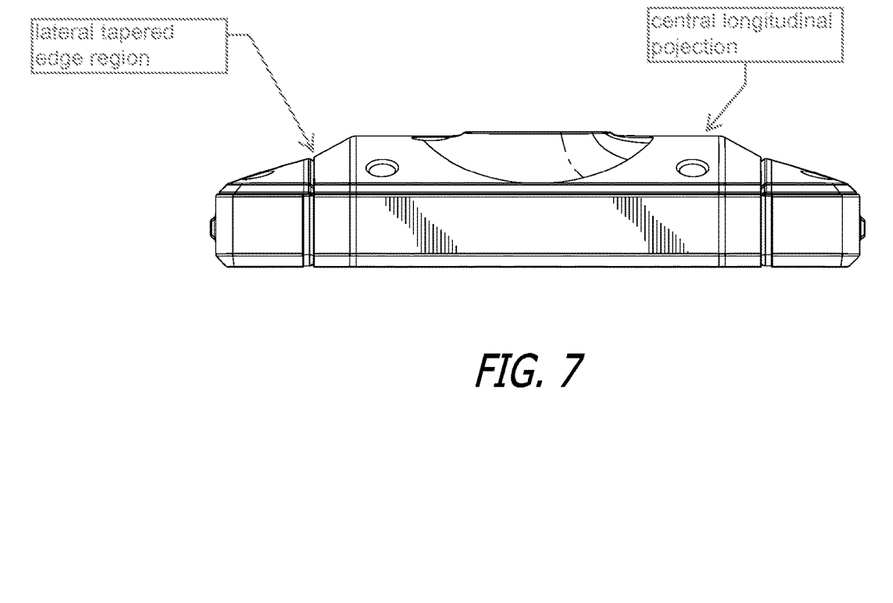
FIG. 7 is a top side elevation view of the Mobile Phone illustrated in FIG. 1.
Figure 8:
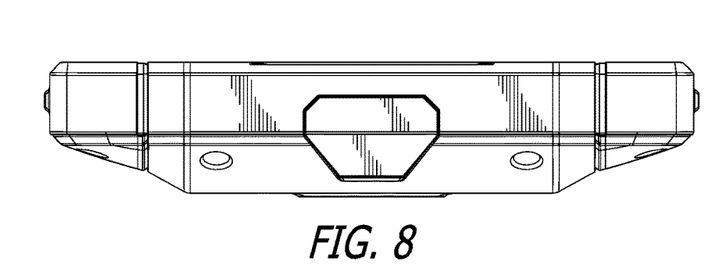
FIG. 8 is a bottom side elevation view of the Mobile Phone illustrated in FIG. 1.

In an exemplary embodiment, the mobile phone body may be configured to permit ergonomic handling, while providing sufficient space for internal components and/or ruggedized features. As shown in FIGS. 7-8, the mobile phone may include tapered lateral edge regions such that the longitudinal (long-dimension as view from in front) lateral (side as view from above or below) region is of reduced thickness between the front (screen) and back (case) face of the mobile device as compared to the central region. For example, the front face of the mobile phone may be generally flat, or minor variation due to buttons or other input/output devices. However, the mobile phone front is generally planar. The mobile phone back face however, may be generally symmetric about the central longitudinal axis. The back face may be furthest away from the front face through a central region from generally the top of the mobile device to the bottom of the mobile device. The back face may taper from a greater distance away from the front face to a closer distance to the front face at the lateral edges. The greater distance between the front face and back face devices a central longitudinal cavity of greater thickness to accommodate internal components, such as an elongate battery. The elongate battery may have a greater thickness than the other internal components and be positioned along, overlapping, proximate the central longitudinal axis of the mobile device. The reduced thickness of the lateral edges permit ergonomic handling while permitting greater component integrity, and selection.

In an exemplary embodiment, a contoured back face may permit removable attachment of different components. For example, if a contoured back face of FIG. 4 is used, then a plurality of attachment points may be defined at the transition from the central region of the back face positioned further from the front face and the tapered lateral regions that move toward the front face. Essentially a longitudinal projection is defined by the contoured back face. On opposing sides of the longitudinal projection, a plurality of attachment locations can be created. As shown, two indentations or overhangs are defined on each lateral side of the longitudinal projection. These attachment points may include trapezoidal (or other geometric or other shaped) recesses comprising a metal part (e.g. bar or sheet) creating an overhang to define a locking point for an attachable component. The overhang may create a cavity/indentation/detent in which an attachable component may hook/mate or otherwise removably attach. Also accessories could physically attached using a sliding dove tail joint by sliding on to the back from the top or bottom of the phone.

In an exemplary embodiment, a data and/or power interface may be provided for other components. As shown in FIG. 4, contact points may be provided to permit data and/or power to/from the attached component and the mobile device. For example, the contacts may support USB and/or HDMI connection.

In an exemplary embodiment, a dynamically adjustable mobile device is provided that permits the interchangeable and removable attachment of various implements to a mobile device, such as a mobile phone. For example, the mobile device may include a plurality of attachment points such as anchors for which the attachable component may removably attach, or hook. The mobile device may also include a data/power interface to couple the attachable component to the mobile device and integrate the two separable components into a single working device. The attachable component may include mating attachment devices to couple to the attachment points of the mobile device and/or data/power contacts for the data/power contacts of the mobile device. The attachable component may include an actuator to engage/disengage the attachment mechanism to/from the attachment point of the mobile phone. For example, the attachable component may include a compression region, button, grip, switch, or other actuator for translating/rotating hooks or attachment feature for opening/closing the attachment feature of the attachable component to the mobile device attachment point.

Exemplary attachable components may include laser (or other optical) measure, thermal camera, auxiliary battery, flash light, kickstand, keypad, screen, etc. and combinations thereof. For example, a first attachable component may include a bidirectional laser that emits a laser light in opposing linear directions. The laser measure may include two optical sensors for receiving reflections of the emitted laser light. The laser measure may communicate information to the mobile device or may internally include components for measuring a traversed distance from the emitted laser. Therefore, the bidirectional laser measure may determine a linear total length between two surfaces (such as two walls) in which the mobile device is positioned between. The laser component may include one or two or more laser measure components. For another example, the attachable component may include a keyboard and/or display. In an exemplary embodiment, the attachable component may resemble a laptop with a screen and keyboard pivotally attached. The keyboard portion may include a cradle in which the mobile device may be positioned. In an exemplary embodiment, the mobile device may include the electronic/digital/computing components, while the "laptop" simply provides the input/output interfaces/components. The mobile device may be configured to act as a track pad when attached to the attachable component.

Exemplary embodiments include customized applications that may be displayed on the mobile device screen consistent or complimentary to the attached tool. The device may automatically recognize an attached tool and launch the associated application or may permit user download and selection of a desired application for one or more attached devices.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A mobile electronic device comprising a body having:
   a front side having a touch screen;
   a back side; and
   top and bottom sides, a lateral side between the front side and the contoured back side, wherein the front side, back side and lateral side defines an interior for holding electronic components, said body being generally rectangular and forming corners, said sides having non-uniform thicknesses, said top and bottom sides and corners being thicker than said front, rear and lateral sides.

2. A mobile electronic device as defined in claim 1, wherein said top and bottom sides and corners having thickness 3-5 times the thicknesses of said front, rear and lateral sides.

3. A mobile electronic device as defined in claim 1, wherein said back side is secured to said body by means of a plurality of screws spaced from each other along a perimeter of said backside generally extending proximate to said top, bottom and lateral sides, the spacing between said screws along said top and bottom sides of greater thickness being greater than the spacing along said lateral sides of lesser thickness.

\* \* \* \* \*